(12) United States Patent
Weydert et al.

(10) Patent No.: US 11,702,533 B2
(45) Date of Patent: Jul. 18, 2023

(54) RUBBER COMPOSITION AND A RUBBER PRODUCT

(71) Applicants: THE GOODYEAR TIRE & RUBBER COMPANY, Akron, OH (US); LUXEMBOURG INSTITUTE OF SCIENCE AND TECHNOLOGY, Esch-sur-Alzette (LU)

(72) Inventors: Marc Weydert, Bertrange (LU); Frida Nzulu, Rollingen (LU); Arpan Datta Sarma, Esch-sur-Alzette (LU); Pierre Verge, Esch-sur-Alzette (LU); Daniel Schmidt, Esch-sur-Alzette (LU)

(73) Assignees: The Goodyear Tire & Rubber Company, Akron, OH (US); Luxembourg Institute of Science and Technology (LIST), Esch-sur-Alzette (LU)

( * ) Notice: Subject to any disclaimer, the term of this patent is extended or adjusted under 35 U.S.C. 154(b) by 273 days.

(21) Appl. No.: 17/231,157

(22) Filed: Apr. 15, 2021

(65) Prior Publication Data
US 2021/0324182 A1    Oct. 21, 2021

Related U.S. Application Data

(60) Provisional application No. 63/011,251, filed on Apr. 16, 2020.

(51) Int. Cl.
| | |
|---|---|
| *C08L 9/06* | (2006.01) |
| *C08K 3/36* | (2006.01) |
| *B60C 1/00* | (2006.01) |
| *C08K 5/1515* | (2006.01) |
| *C08L 91/00* | (2006.01) |

(52) U.S. Cl.
CPC .............. *C08L 9/06* (2013.01); *B60C 1/0016* (2013.01); *C08K 3/36* (2013.01); *C08K 5/1515* (2013.01); *C08L 91/00* (2013.01); *C08K 2201/006* (2013.01); *C08L 2205/02* (2013.01)

(58) Field of Classification Search
CPC ... C08L 91/00; C08L 9/06; C08K 3/36; B60C 1/00

USPC .......................................................... 524/492
See application file for complete search history.

(56) References Cited

U.S. PATENT DOCUMENTS

| | | | |
|---|---|---|---|
| 6,004,923 A * | 12/1999 | Oftring .................. | C07C 229/22 510/499 |
| 7,285,584 B2 | 10/2007 | Hsu et al. | |
| 7,473,724 B2 | 1/2009 | Hsu et al. | |
| 7,714,051 B2 | 10/2010 | Hahn | |
| 8,261,796 B2 | 9/2012 | Mruk et al. | |
| 9,284,437 B2 | 3/2016 | Hahn | |
| 2011/0146873 A1 * | 6/2011 | Weydert ................. | C08K 5/103 152/547 |

FOREIGN PATENT DOCUMENTS

| | | |
|---|---|---|
| CN | 101659627 A | 3/2010 |
| EP | 1072442 A1 | 3/2005 |
| EP | 2340946 B1 | 11/2012 |
| EP | 2792689 B1 | 10/2014 |
| WO | 2020016439 A1 | 1/2020 |

OTHER PUBLICATIONS

Atanu Biswas et al, "Synthesis of Diethyllamine-Functionlized Soyben Oil", Journal of Agricultural and Food Chemistry, vol. 53, No. 24, Nov. 5, 2005, (Nov. 5, 2005) pp. 9485-9490.

European Search Report dated Aug. 26, 2021 for European Patent Application No. EP21168197 which is a counterpart to the subject patent application.

\* cited by examiner

*Primary Examiner* — Deve V Hall
(74) *Attorney, Agent, or Firm* — Alvin T. Rockhill (57) ABSTRACT

The present invention is directed to a rubber composition comprising 100 phr of at least one diene-based rubber, 30 phr to 250 phr of at least one filler, and 1 phr to 40 phr of an epoxidized and aminated fatty acid ester, wherein the epoxidized and aminated fatty acid ester is obtained from the reaction of an epoxidized fatty acid ester with an aliphatic amine. Furthermore, the present invention is directed to a rubber product, such as a tire, comprising such a rubber composition.

20 Claims, 1 Drawing Sheet

RUBBER COMPOSITION AND A RUBBER PRODUCT

This application claims benefit of U.S. Provisional Patent Application Ser. No. 63/011,251 filed on Apr. 16, 2020. The teachings of U.S. Provisional Patent Application Ser. No. 63/011,251 are incorporated herein by reference in their entirety.

FIELD OF THE INVENTION

The present invention relates to a rubber composition or non-vulcanized rubber composition for utilization in manufacturing a rubber product, such as a tire or a tire component.

BACKGROUND OF THE INVENTION

Mineral oils and unmodified vegetable oils are currently used as liquid plasticizers in tire rubber formulations and in rubber formulations for use in manufacturing a wide variety of other rubber products. To enhance processability and to reduce uncured compound viscosity, further processing aids, such as soaps of fatty acids, are also frequently included in such rubber formulations. Conventional liquid plasticizers and processing aids reduce the uncured compound viscosity of rubber formulations and make it easier to mix such formulations. However, plasticizers and processing aids can also have a negative impact on the cured properties of the rubber composition. In particular, the inclusion of plasticizers and/or processing aids in rubber formulations can result in reduce storage modulus, reduced wear resistance and/or increase hysteresis. Increased hysteresis in tire tread rubber formulations is not desirable since it results in increased rolling resistance and consequently reduced vehicle fuel economy. There is accordingly a continuing and long felt need for the development of new processing aids or plasticizers that have a reduced level of detrimental impact on the properties of the cured rubber composition (are less detrimental to cured rubber properties).

SUMMARY OF THE INVENTION

One object of the present invention may be to provide an advanced rubber composition having plasticizers with limited impact on cured rubber composition properties and which in particular have less of a detrimental impact on cured rubber properties including storage modulus, wear resistance, cut resistance, and/or hysteresis.

Another object of the invention may be to provide an advanced rubber composition that has a good tensile strength and/or an improved storage modulus in a cured state.

Another object of the invention may be to provide an advanced rubber composition having plasticizers that reduce the mixing energy required during one or more mixing stages of the uncured rubber composition, such as reduced mixing energy requirements for mixing of non-productive and producative rubber formulations.

A first aspect of the present invention is directed to a rubber composition comprising 100 phr (parts by weight peer 100 parts by weight of rubber) of at least one diene-based elastomer, 30 phr to 250 phr of at least one filler, and 1 phr to 40 phr of an epoxidized and aminated fatty acid ester, wherein the epoxidized and aminated fatty acid ester is obtained from the reaction of an epoxidized fatty acid ester with an aliphatic amine.

It has been found by the inventors that such epoxidized and aminated fatty acid esters (e.g. triglycerides) provide a significant reduction of the mixing energy and increase cured compound properties such as storage modulus and/or tensile strength when included in rubber formulations. On one hand, the increased polarity of the functional groups present in the modified fatty acide esters enhances their interaction with the surface of fillers (in particular in silica filled compounds). On the other hand, the presence of aliphatic amine groups in particular accelerates the curing of the rubber compound and/or enhances the mechanical properties of the rubber network in compositions where the epoxidized and aminated fatty acid ester is present. Moreover, it has been found by the inventors that heterocyclic amines may result in undesirable side reactions. For example, glycerol based structures can potentially react in a manner that destroys the triglyceride structure. Accordingly, it is typically preferred for the rubber formulations of this invention to be void of heterocyclic amines.

In one embodiment of the subject invention, the epoxidized and aminated fatty acid ester is obtained from the reaction of an epoxidized fatty acid ester with a secondary aliphatic amine. Epoxidized fatty acid esters that are useful in the practice of this invention are commercially available as such. In particular, triglycerides are known to be made from a glycerol and three fatty acids by an ester reaction (esterification), either in nature or chemically. In other words, the triglycerides are an esterification (reaction) product of a glycerol with three fatty acids. Such a reaction may for instance occur in nature and result in the vegetable oils listed herein. The fatty acids employed in synthesizing epoxidized fatty acid esters typically contain at least one double bond. During the epoxidation such double bonds in the fatty acids are replaced by epoxy groups. In some cases epoxidation may also occur naturally. A further amination of the epoxy groups creates hydroxyl groups and amine groups at carbon atoms where an epoxy group was situated before the amination.

In one embodiment of this invention, said amine is a dialkyl amine. Such dialkylamines are readily available on a commercial basis and result in the formation of epoxidized fatty acid esters having good interaction with fillers and good reactivity. The dialkyl amines utilized in the practice of this invention will normally have alkyl groups that contain from 1 to 8 carbon atoms. Some representative examples of dialkylamines that can be used include dimethylamine, diethylamine, di-n-propylamine, di-iso-propylamine, di-n-butylamine, di-iso-butylamine, di-t-butylamine, dipentylamines, dihexylamines, diheptylamines, and dioctylamines. Various mixtures of dialkylamines and dialkylamines having dissimilar alkyl groups can also be employed.

In a further embodiment of this invention, the amine does not have nitrogen atoms bonded in an aromatic ring or directly bonded to an aromatic ring. In other words, the amine is free of aromatic rings and/or aromatic rings comprising a nitrogen atom in the ring and/or aromatic rings with a nitrogen atom directly bonded to that ring. In such a manner, amine groups are relatively alkaline and/or nucleophilic, thereby favoring the epoxy-amine reaction used to synthesize the aminated epoxidized fatty acid esters. At the same time, they are enabled to act as cure accelerators because the tertiary amine groups remain rather alkaline. In contrast, amines where the nitrogen is bonded to or a part of one or more aromatic systems, are poor nucleophiles and not very alkaline. Such amines which are poor nucleophiles exhibit slower reaction kinetics in the context of the epoxy-amine reaction and/or prevent them from acting as cure accelerators in the vulcanization of rubber formulations.

In one embodiment of this invention, the epoxidized and aminated fatty acid ester is a triglyceride, preferably an epoxidized and aminated vegetable oil. For instance, the vegetable oil that forms the basis for such a compound can be selected from the group of sunflower oil, soybean oil, palm oil, canola oil, rapeseed oil, corn oil, coconut oil, cottonseed oil, olive oil, peanut oil, and safflower oil. However, apart from such an embodiment, mono glycerides and diglycerides are also within the scope of the present invention. Such monoglycerides, have a polar end (with two glycerol hydroxyls) that may link to the silica surface. In addition, the monoglyceride may have X aminated epoxy groups along the fatty acid chain (with secondary hydroxyls associated), Y epoxy groups along the fatty acid chain and Z C=C double bonds along the fatty acid chain, preferably with, $X+Y+Z<=3$ (X, Y, Z being positive integers from 0 to 3, and preferably one or more of $0<X<=3$, $0<=Y<3$, and $0<=Z<3$). Such molecules can stick to the silica surface effectively while at the same time reducing the viscosity of the compound (also in view of their low molecular weight) compared to larger molecules such a triglycerides, and still bring in useful levels of cure acceleration. Diglycerides are less polar than the above described monoglycerides which could potentially result in unwanted moisture in the compound, and may mean that the solubility limit in the rubber is lower. The diglycerides have a lower viscosity than the triglycerides but are not as polar as the monoglycerides, meaning a lower risk of insolubility. Thus, diglycerides could be used as a compromise between the properties of monoglycerides and triglycerides.

In still another embodiment of this invention, the fatty acid ester, e.g. the triglyceride, comprises fatty acid chain(s) (or fatty acid rests or residues, in particular three of those), wherein all or at least the majority of double bonds (C=C bonds) of the fatty acid chains or residues have been epoxidized. In another embodiment, the ratio of epoxidized carbon-carbon double bonds to non-epoxidized carbon-carbon double bonds is at least 1:1. In another embodiment, all but one double bond in the fatty acid chains are epoxidized.

In one embodiment of this invention, the degree of amination of the epoxidized double bonds is within a range of 5% to 100%, and is preferably within the range of 10% to 100%. For example, the degree of amination of the epoxidized double bonds can be within a range of 20% to 50%, within the range of 50% to 90%, or within the range of 40% to 60%.

In other words, 5% to 100% of all epoxidized double bonds in the fatty acids or residues of fatty acids are aminated. Thus, according to one embodiment of this invention, not all of the epoxidized double bonds or epoxy groups are aminated. This has the advantage that the epoxy groups remain available to interact with the silica surface. Additionally, the aminated epoxy groups may be available to increase crosslinking in the rubber network. Also full amination may not be desirable as cure is further accelerated. Moreover, as amine groups increase scorch and also stiffness, it may also be desirable to reduce the degree of amination while maintaining strong interactions with the silica surface through the presence of epoxy groups, which do not accelerate curing in the same fashion. Thus, in another preferred embodiment the degree of amination of the epoxidized double bonds may be within a range of 5% to 90%, preferably 10% to 90%, or even more preferably between 10% and 60%.

In another embodiment of this invention, the aminated epoxidized fatty acid ester is a mixture whose average degree of amination (vs. the content of epoxy group initially present prior to the amination reaction) is between 5% and 100%, and preferably between 10% and 100% (by mol %). For instance, the average degree of amination can be within the range of 10% to 90%, within the range of 20% to 50%, within the range of 50% to 90%, within the range of 30% to 80%, or within the range of 40% to 60%.

In another embodiment of the subject invention, said filler comprises from 50 phr to 250 phr of silica. In particular, in case of high silica amounts, large amounts of plasticizer may be necessary so that it is desirable that such plasticizers have a benefit for the rubber composition also in a cured state. The epoxidized and aminated fatty acid esters, such as triglycerides, significantly improve the properties of the filler and cured rubber networks.

In another embodiment of the present invention, said filler comprises from 110 phr to 250 phr of silica. The advantages of the present invention are even more relevant in case of such high silica contents.

In still another embodiment, said silica has a surface area within a range of 80 $m^2/g$ to 250 $m^2/g$ according to ASTM D5604-96 (2017). In still another embodiment, said silica has 5-15 silanol groups per square nanometer surface area.

In still another embodiment, the rubber composition comprises at least one (further) liquid plasticizer, wherein the ratio between the liquid plasticizer and the fatty acid ester, such as said triglyceride, ranges from 20:1 to 3:1. Liquid plasticizers could for instance be selected from one or more of: resins, oils, and liquid polymers. As used herein the term "liquid plasticizer" means a plasticizer which is liquid at 23° C. Preferably, the liquid plasticizer remains in liquid state at temperatures which are within the range of 15° C. to 160° C.

In still another embodiment of the subject invention, the rubber composition comprises from 1.5 phr to 20 phr of epoxidized and aminated triglyceride. In another embodiment, it comprises from from 1.5 phr to 10 phr, or even from 1.5 to 8 phr, or even more preferably from 2 phr to 8 phr of the epoxidized and aminated triglyceride.

In still another embodiment, said diene based rubber is comprised of 60 phr to 100 phr (preferably 75 phr to 100 phr) of styrene-butadiene rubber (SBR), and 0 phr to 40 phr (preferably 25 phr) of polybutadiene rubber. For instance, the SBR could be a solution polymerized SBR (SSBR).

In still another embodiment, said styrene-butadiene rubber has a glass transition temperature within a range of −85° C. to −5° C. and/or the polybutadiene has a glass transition temperature within a range of from −85 to −110° C. The polybutadiene rubber can be high-cis-1,4-polybutadiene rubber having a cis-microstructure content of at least 95%, 96%, or even 98%.

In another embodiment, the fatty acid ester, in particular the (epoxidized and aminated) triglyceride comprises fatty acid residues comprising from 1 to 4 epoxy groups and from 1 to 4 hydroxyl groups and from 1 to 4 nitrogen containing groups, such as amine groups. Preferably, said triglyceride contains from 1 to 2 hydroxyl groups, from 1 to 2 nitrogen containing groups, such as amine groups, and from 2 to 4 epoxy groups.

In another embodiment, the rubber composition may include at least one and/or one additional diene-based rubber. Representative synthetic polymers may be the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter may be acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g. acrolein, methyl isopropenyl ketone and vinyl-ethyl ether. Specific examples of synthetic rubbers include neoprene (polychloroprene), polybutadiene (including cis 1,4-polybutadiene), polyisoprene (including cis 1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. Preferred rubber or elastomers may be in general natural rubber, synthetic polyisoprene, polybutadiene and SBR including SSBR.

In a preferred embodiment, the composition comprises less than 5 phr of natural rubber and/or polyisoprene or is essentially free or is entirely free of natural rubber and/or polyisoprene.

In another embodiment, the composition may comprise at least two diene-based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers, and emulsion polymerization prepared butadiene/acrylonitrile copolymers.

In another embodiment, an emulsion polymerization derived styrene-butadiene rubber (ESBR) that can be used has a bound styrene content of 20 percent to 28 percent, and in some applications the ESBR may have a medium to relatively high bound styrene content, namely, a bound styrene content which is within the range of 30 percent to 45 percent. In many cases the ESBR will have a bound styrene content which is within the range of 26 percent to 31 percent. The term ESBR indicates that the styrene-butadiene rubber is synthesized by the copolymerization of styrene monomer and 1,3-butadiene monomer in an aqueous emulsion in the presence of an emulsifier. ESBR is well known to those skilled in the art. The bound styrene content can vary, for example, from 5 to 50 percent. In one aspect, the ESBR may also contain acrylonitrile to form a terpolymer rubber, as ESBAR, in amounts, for example, of 2 weight percent to 30 weight percent bound acrylonitrile in the terpolymer. Emulsion polymerization prepared styrene/butadiene/acrylonitrile copolymer rubbers containing 2 weight percent to 40 weight percent bound acrylonitrile in the copolymer may also be contemplated as diene-based rubbers.

In another embodiment, solution polymerization prepared SBR (SSBR) may be used. Such an SSBR may for instance have a bound styrene content in a range of 5 percent to 50 percent, preferably 9 percent to 36 percent, and most preferably 26 percent to 31 percent. The SSBR can be conveniently prepared, for example, by anionic polymerization in an inert organic solvent. More specifically, the SSBR can be synthesized by copolymerizing styrene monomer and a 1,3-butadiene monomer in a hydrocarbon solvent utilizing an organo lithium compound, such as an alkyl lithium compound, as the initiator. In still another embodiment, the solution styrene butadiene rubber is a tin-coupled polymer. In still another embodiment, the SSBR is functionalized for improved compatibility with silica. In addition, or alternatively, the SSBR is thio-functionalized. This helps to improve stiffness of the compound and/or its hysteresis behavior. Thus, for instance, the SSBR may be a thio-functionalized, tin-coupled solution polymerized copolymer of butadiene and styrene.

In one embodiment, a synthetic or natural polyisoprene rubber may be used. Synthetic cis-1,4-polyisoprene and natural rubber are as such well known to those having skill in the rubber art. In particular, the cis 1,4-microstructure content is typically at least 90%, generally at least 95%, and frequently at least 97%, or even higher.

In one embodiment, cis-1,4-polybutadiene rubber (BR or PBD) is used. Suitable polybutadiene rubbers may be prepared, for example, by organic solution polymerization of 1,3-butadiene. The BR may be conveniently characterized, for example, by having at least a 90 percent cis-1,4-microstructure content ("high cis" content) and a glass transition temperature (Tg) in a range of from –95 to –110° C. Suitable polybutadiene rubbers are available commercially, such as Budene® 1207, Budene® 1208, Budene® 1223, or Budene® 1280 from The Goodyear Tire & Rubber Company. These high cis-1,4-polybutadiene rubbers can for instance be synthesized utilizing nickel catalyst systems which include a mixture of (1) an organonickel compound, (2) an organoaluminum compound, and (3) a fluorine containing compound as described in U.S. Pat. Nos. 5,698,643 and 5,451,646, which are incorporated herein by reference.

A glass transition temperature, or Tg, of an elastomer or elastomer composition, where referred to herein, represents the glass transition temperature(s) of the respective elastomer or elastomer composition in its uncured state or possibly a cured state in the case of an elastomer composition. A Tg can be suitably determined by the midpoint or inflection point of the step observed in association with the glass transition, as measured using a differential scanning calorimeter (DSC) at a temperature change rate of 10° C. per minute, according to ASTM D3418.

The term "phr" as used herein, and according to conventional practice, refers to "parts by weight of a respective material per 100 parts by weight of rubber, or elastomer". In general, using this convention, a rubber composition is comprised of 100 parts by weight of rubber/elastomer. The claimed composition may comprise other rubbers/elastomers than explicitly mentioned in the claims, provided that the phr value of the claimed rubbers/elastomers is in accordance with claimed phr ranges and the amount of all rubbers/elastomers in the composition results in total in 100 parts of rubber. In an example, the composition may further comprise from 1 phr to 10 phr, optionally from 1 phr to 5 phr, of one or more additional diene-based rubbers, such as SBR, SSBR, ESBR, PBD/BR, NR and/or synthetic polyisoprene. In another example, the composition may include less than 5 phr, preferably less than 3, phr of an additional diene-based rubber or be also essentially free of such an additional diene-based rubber. The terms "compound" and "composition" and "formulation" may be used herein interchangeably, unless indicated otherwise.

In an embodiment, the rubber composition may also include one or more additional oils, in particular (additional) processing oils. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils may include various oils as are known in the art, including aromatic, paraffinic, naphthenic, vegetable oils, and low PCA oils, such as MES, TDAE, SRAE and heavy naphthenic oils. Suitable low PCA oils may include those having a polycyclic aromatic (PCA) content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom. Some representative examples of (non-aminated and non-epoxidized) vegetable oils that can be used include soybean oil, sunflower oil, canola (rapeseed) oil, corn oil, coconut oil, cottonseed oil, olive oil, palm oil, peanut oil, and safflower oil.

In an embodiment, the rubber composition may include silica. Commonly employed siliceous pigments which may be used in the rubber compound include for instance conventional pyrogenic and precipitated siliceous pigments (silica). In one embodiment, precipitated silica is used. The conventional siliceous pigments may be precipitated silicas such as, for example, those obtained by the acidification of a soluble silicate, e.g., sodium silicate. Such conventional silicas might be characterized, for example, by having a BET surface area, as measured using nitrogen gas. In one embodiment, the BET surface area may be in the range of 40 $m^2/g$ to 600 $m^2/g$ (square meters per gram). In another embodiment, the BET surface area may be in a range of 50 $m^2/g$ to 300 $m^2/g$ (square meters per gram). The BET surface area can be suitably determined according to ASTM D5604-96 or equivalent. The conventional silica may also be characterized by having a dibutylphthalate (DBP) absorption value in a range of 100 $cm^3/100$ g to 400 $cm^3/100$ g, alternatively 150 $cm^3/100$ g to 300 $cm^3/100$ g which can be suitably determined according to ASTM D 2414 or equivalent. Various commercially available silicas may be used, such as, only for example herein, and without limitation, silicas commercially available from PPG Industries under the Hi-Sil trademark with designations 210, 315G, EZ160G, etc.; silicas available from Solvay, with, for example, designations ZeoSil 1165 MP and ZeoSil Premium 200 MP, etc.; and silicas available from Evonik AG with, for example, designations VN2 and Ultrasil 6000GR, 9100GR, etc.

In still another embodiment, the rubber composition may comprise pre-silanized and precipitated silica which may for instance have a CTAB adsorption surface area of between 130 $m^2/g$ and 210 $m^2/g$, optionally between 130 $m^2/g$ and 150 $m^2/g$ and/or between 190 $m^2/g$ and 210 $m^2/g$, or even between 195 $m^2/g$ and 205 $m^2/g$. The CTAB (cetyl trimethyl ammonium bromide) method for determination of the silica surface area (ASTM D6845) is known to a person skilled in the art.

In another embodiment, surface-modified precipitated silica which is treated prior to its addition to the rubber composition with at least one silane or silazane is employed. Suitable surface modification agents include but are not limited to alkylsilanes, alkoxysilanes, organoalkoxysilyl polysulfides, organomercaptoalkoxysilanes, and hexamethyldisilazane.

Silica dispersing aids, which can optionally be used, can be present in an amount ranging from about 0.1% to about 25% by weight, based on the weight of the silica, with about 0.5% to about 20% by weight being suitable, and about 1% to about 15% by weight based on the weight of the silica also being suitable. Various pre-treated precipitated silicas are described in U.S. Pat. Nos. 4,704,414, 6,123,762 and 6,573,324. The teachings of U.S. Pat. Nos. 4,704,414, 6,123,762 and 6,573,324 are incorporated herein by reference.

Some non-limiting examples of pre-treated silicas (i.e. silicas that have been pre-surface treated with a silane) which are suitable for use in the practice of this invention include, but are not limited to, Ciptane® 255 LD and Ciptane® LP (PPG Industries) silicas that have been pre-treated with a mercaptosilane, and Coupsil® 8113 (Degussa) that is the product of the reaction between organosilane bis(triethoxysilylpropyl) polysulfide (Si69) and Ultrasil® VN3 silica, and Coupsil® 6508, Agilon® 400 silica from PPG Industries, Agilon® 454 silica from PPG Industries, and Agilon® 458 silica from PPG Industries. Some representative examples of preferred pre-silanized precipitated silicas include Agilon® 400, Agilon® 454 and Agilon® 458 from PPG Industries.

A representative silica coupler (silica coupling agent) having a moiety reactive with hydroxyl groups on pre-silanized precipitated silica and on precipitated silica and another moiety interactive with said elastomers, may be comprised of, for example:
(A) bis(3-trialkoxysilylalkyl) polysulfide containing an average in range of from about 2 to about 4, alternatively from about 2 to about 2.6 or from about 3.2 to about 3.8, sulfur atoms in its connecting bridge, or (B) an alkoxyorganomercaptosilane, or (C) their combination. A representative example of such bis(3-trialkoxysilylalkyl) polysulfide is comprised of bis(3-triethoxysilylpropyl) polysulfide. As indicated, for the pre-silanized precipitated silica, the silica coupler may be desirably an alkoxyorganomercaptosilane. For the non-pre-silanized precipitated silica, the silica coupler may be desirably comprised of the bis(3-triethoxysilylpropyl) polysulfide.

In one embodiment, the rubber composition is exclusive of addition of silica coupler to the rubber composition (thereby exclusive of silica coupler).

As indicated, in one embodiment, the rubber composition may contain a combination of additional silica coupler added to the rubber composition, particularly a bis(3-triethoxysilylpropyl) polysulfide containing an average of from about 2 to about 4 connecting sulfur atoms in its polysulfidic bridge together with an additional precipitated silica (non-pre-silanized precipitated silica) added to said rubber composition, wherein the ratio of pre-silanized precipitated silica to said precipitated silica is desirably at least 8/1, alternately at least 10/1.

In an embodiment, the rubber composition may include carbon black. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991 grades. These carbon blacks have iodine absorptions ranging from 9 to 145 g/kg and a DBP number ranging from 34 to 150 cm3/100 g. Iodine absorption values can be suitably determined according to ASTM D1510 or equivalent. Commonly employed carbon blacks can be used as a conventional filler in an amount ranging from 10 to 150 phr. However, in a preferred embodiment the composition comprises at most 10 phr of carbon black, preferably at most

5 phr of carbon black, as preferred embodiments are directed to high silica compounds and the improvement of their properties.

In another embodiment, other fillers may be used in the rubber composition including, but not limited to, particulate fillers including ultra high molecular weight polyethylene (UHMWPE), crosslinked particulate polymer gels including but not limited to those disclosed in U.S. Pat. Nos. 6,242,534, 6,207,757, U.S. Pat. Nos. 6,133,364, 6,372,857, 5,395,891, or 6,127,488, and a plasticized starch composite filler including but not limited to that disclosed in U.S. Pat. No. 5,672,639. The teachings of U.S. Pat. Nos. 6,242,534, 6,207,757, 6,133,364, 6,372,857, 5,395,891, 6,127,488, and U.S. Pat. No. 5,672,639 are incorporated herein by reference. Syndiotactic polybutadiene may also be utilized. Such other fillers may be used in an amount ranging from 1 phr to 30 phr.

In one embodiment, the rubber composition may contain a conventional sulfur containing organosilicon compounds or silanes. Examples of suitable sulfur containing organosilicon compounds are of the formula:

Z-Alk-Sn-Alk-Z    I in which Z is selected from the group consisting of where $R^1$ is an alkyl group of 1 to 4 carbon atoms, cyclohexyl or phenyl; $R^2$ is an alkoxy of 1 to 8 carbon atoms, or cycloalkoxy of 5 to 8 carbon atoms; Alk is a divalent hydrocarbon of 1 to 18 carbon atoms and n is an integer of 2 to 8. In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl) tetrasulfide. Therefore, as to formula I, Z may be where $R^2$ is an alkoxy of 2 to 4 carbon atoms, alternatively 2 carbon atoms; Alk is a divalent hydrocarbon of 2 to 4 carbon atoms, alternatively of 3 carbon atoms; and n is an integer of from 2 to 5, alternatively 2 or 4. In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)-S-CH_2CH_2CH_2Si(OCH_2CH_3)_3$, which is available commercially as NXT™ from Momentive Performance Materials. In another embodiment, suitable sulfur containing organosilicon compounds include those disclosed in United States Patent Application Publication No. 2003/0130535. In one embodiment, the sulfur containing organosilicon compound is Si-363 from Degussa. The amount of the sulfur containing organosilicon compound in a rubber composition may vary depending on the level of other additives that are used. Generally speaking, the amount of the compound may range from 0.5 phr to 20 phr. In one embodiment, the amount will range from 1 phr to 10 phr.

In another embodiment, the rubber composition comprises less than 0.1 phr cobalt salt or 0 phr cobalt salt.

It is readily understood by those having skill in the art that the rubber composition may be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants, antiozonants and peptizing agents. As known to those skilled in the art, depending on the intended use of the sulfur vulcanizable and sulfur-vulcanized material (rubbers), the additives mentioned above are selected and commonly used in conventional amounts. Some representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may for instance be used in an amount ranging from 0.5 phr to 8 phr, alternatively with a range of from 1.5 phr to 6 phr. Typical amounts of tackifier resins, if used, comprise for example 0.5 phr to 10 phr, usually 1 phr to 5 phr. Typical amounts of processing aids, if used, comprise for example 1 phr to 50 phr (this may comprise in particular oil). Typical amounts of antioxidants, if used, may for example comprise 1 phr to 5 phr. Representative antioxidants may be, for example, diphenyl-p-phenylenediamine and others, such as, for example, those disclosed in The Vanderbilt Rubber Handbook (1978), Pages 344 through 346. Typical amounts of antiozonants, if used, may for instance comprise 1 phr to 5 phr. Typical amounts of fatty acids, if used, which can include stearic acid, may for instance comprise 0.5 phr to 3 phr. Typical amounts of waxes, if used, are typically employed at a level which is within the range of 1 phr to 5 phr. Often microcrystalline waxes are used. Typical amounts of peptizers, if used, are normally within the range of 0.1 phr to 1 phr. Typical peptizers may be, for example, pentachlorothiophenol and/or dibenzamidodiphenyl disulfide.

Accelerators may be preferably but not necessarily used to control the time and/or temperature required for vulcanization and to improve the properties of the vulcanizate. In one embodiment, a single accelerator system may be used, i.e. primary accelerator. The primary accelerator(s) may be used in total amounts ranging from 0.5 phr to 4 phr, alternatively 0.8 phr to 1.5 phr. In another embodiment, combinations of a primary and a secondary accelerator might be used with the secondary accelerator being used in smaller amounts, such as from 0.05 phr to 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are for instance amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be for instance a guanidine, dithiocarbamate or thiuram compound. Suitable guanidines include dipheynylguanidine and the like. Suitable thiurams include tetramethylthiuram disulfide, tetraethylthiuram disulfide, and tetrabenzylthiuram disulfide.

The mixing of the rubber composition can be accomplished by methods known to those having skill in the rubber mixing art. For example, the ingredients may be typically mixed in at least two stages, namely, at least one nonproductive stage followed by a productive mix stage. The final curatives including sulfur-vulcanizing agents may be typically mixed in the final stage which is conventionally called the "productive" mix stage in which the mixing typically occurs at a temperature, or ultimate temperature, lower than the mix temperature(s) of the preceding nonproductive mix stage(s). The terms "nonproductive" and "productive" mix stages are well known to those having skill in the rubber mixing art. In an embodiment, the rubber composition may be subjected to a thermomechanical mixing step. The thermomechanical mixing step generally comprises a mechanical working in a mixer or extruder for a period of time, for example suitable to produce a rubber temperature between 140° C. and 190° C. The appropriate duration of the thermomechanical working varies as a function of the operating conditions, and the volume and nature of the components. For example, the thermomechanical working may be from 1 to 20 minutes.

In a second aspect of the invention, the invention is directed to a rubber composition comprising 100 phr of at least one diene-based elastomer, 30 phr to 250 phr of at least one filler, and 1 phr to 40 phr of an epoxidized and aminated fatty acid ester. The epoxidized and aminated fatty acid ester is obtained from the reaction of an epoxidized fatty acid ester with a secondary amine having the following structure (A):

wherein $R^1$, $R^2$, $R^3$, $R^4$, $R^5$, and $R^6$ are independently selected from hydrogens, linear or branched alkyl groups, cycloalkyl groups, aryl groups, hydroxyalkyl groups or alkoxyalkyl groups. In particular, the second aspect of the invention may be combined with all the embodiments mentioned in relation to the first aspect of the invention. These embodiments have just not been repeated again. As explained above, it has been found by the inventors that such epoxidized and aminated fatty acid esters (such as triglycerides) provide a significant reduction of the mixing energy and increase cured compound properties such as storage modulus and/or tensile strength when included in rubber formulations. On one hand, the increased polarity of the functional groups present in the modified fatty acide esters enhances their interaction with the surface of fillers (in particular in silica filled compounds). On the other hand, the presence of the (secondary) amine with structure A, as shown above, can accelerates the curing of the rubber compound and/or enhances the mechanical properties of the rubber network in compositions where the epoxidized and aminated fatty acid ester is present.

In a preferred embodiment, the molecular weight of the secondary amine does not exceed 555 g/mol. In particular such a threshold is desirable to avoid too high viscosities.

In another aspect of the invention, the invention may be directed to a rubber composition comprising 100 phr of at least one diene-based elastomer, 30 phr to 250 phr of at least one filler, and 1 phr to 40 phr of a fatty acid ester. Said fatty acid ester comprises at least one fatty acid residue comprising from 1 to 4 epoxy groups, from 1 to 4 hydroxyl groups and from 1 to 4 nitrogen containing groups, such as amine groups. Preferably, the fatty acid residues have from 1 to 2 hydroxyl groups, from 1 to 2 nitrogen containing groups, and 2 to 4 epoxy groups. This aspect may be combined with the aspects and embodiments already mentioned herein above.

In yet a further aspect, the present invention is directed to a rubber product, the rubber product comprising a rubber composition in accordance with the above mentioned aspects or one or more of their embodiments.

In one embodiment, the rubber product is selected from a tire, a power transmission belt, a hose, a track, an air sleeve and a conveyor belt.

In another embodiment, the rubber product is a tire comprising one or more rubber components selected from a tread, a shearband, rubber spokes, an undertread, a sidewall, an apex, a flipper, a chipper, a chafer, a carcass, a belt, an overlay, wherein one or more of the rubber components comprise the rubber composition.

In still another embodiment, the rubber product is a tire comprising a tread which has the aforementioned rubber composition.

In yet another aspect of the invention, a method of manufacturing a rubber composition is provided, the method comprising one or more of the following steps:

A) epoxidizing a triglyceride to obtain an epoxidized triglyceride, preferably until at least 80%, preferably at least 90%, or even more preferably all fatty acid residues of the triglyceride are epoxidized;

B) aminating the epoxidized triglyceride with an aliphatic amine (such as in accordance with the first aspect of the invention or an amine in accordance with the second aspect of the invention) to obtain an aminated and epoxidized triglyceride, preferably to a degree that less than 90%, preferably less than 80%, or even more preferably less than 50% of epoxy groups of the epoxidized triglyceride are aminated;

C) mixing at least one elastomer with a filler and the aminated and epoxidized triglyceride to obtain a first mixture comprising the elastomer, the filler and the aminated and epoxidized triglyceride (not limited to these three materials);

D) adding to the first mixture at least one sulfur donor; and/or

E) curing the composition, preferably at a temperature within a range of 132° C. (270° F.) to 166° C. (330° F.).

Again, the method may be combined with the features of all of the above mentioned aspects and embodiments.

Vulcanization of the pneumatic tire of the present invention may for instance be carried out at conventional temperatures ranging from 100° C. to 200° C. In one embodiment, the vulcanization is conducted at temperatures ranging from 110° C. to 180° C. Any of the usual vulcanization processes may be used such as heating in a press or mold, heating with superheated steam or hot air. However, it is generally preferred for the tires of this invention to be cured at a temperature ranging from about 132° C. (270° F.) to about 166° C. (330° F.). It is more typical for the tires of this invention to be cured at a temperature ranging from 143° C. (290° F.) to 154° C. (310° F.). Such tires can be built, shaped, molded and cured by various methods which are known and are readily apparent to those having skill in such art.

BRIEF DESCRIPTION OF THE DRAWINGS

The structure, operation, and advantages of the invention will become more apparent upon contemplation of the following description taken in conjunction with the accompanying drawings, wherein.

DETAILED DESCRIPTION OF THE INVENTION

Figure 1:
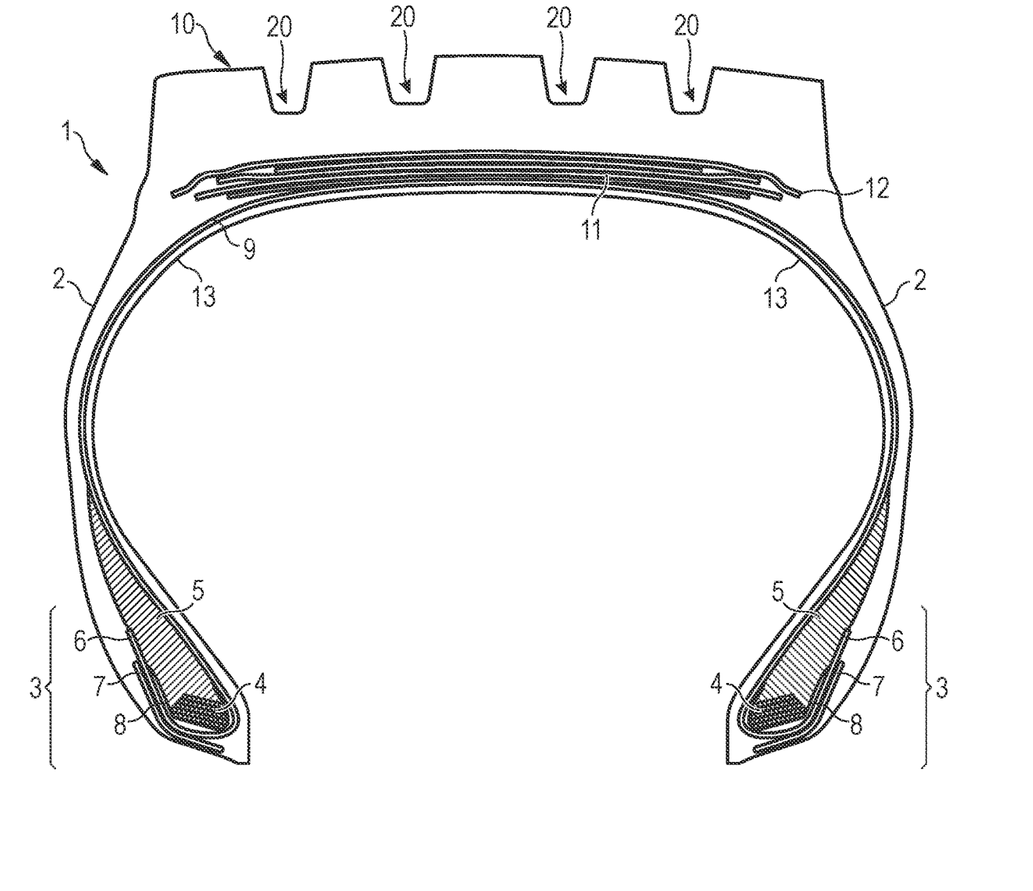
FIG. 1 is a schematic cross section of a tire comprising a rubber component with the rubber composition in accordance with an embodiment of the present invention.

FIG. 1 is a schematic cross-section of a tire 1 according to an embodiment of the invention. The tire 1 has a plurality of tire components such as a tread 10, an innerliner 13, a belt comprising four belt plies 11, a carcass ply 9, two sidewalls 2, and two bead regions 3, bead filler apexes 5 and beads 4. The example tire 1 is suitable, for example, for mounting on a rim of a vehicle, e.g. a truck or a passenger car. As shown in FIG. 1, the belt plies 11 may be covered by an overlay ply 12 and/or may include one or more breaker plies. The carcass ply 9 includes a pair of axially opposite end portions 6, each of which is associated with a respective one of the beads 4. Each axial end portion 6 of the carcass ply 9 may be turned up and around the respective bead 4 to a position to anchor each axial end portion 6. The turned-up portions 6 of the carcass ply 9 may engage the axial outer surfaces of two flippers 8 and axial inner surfaces of two chippers 7 which are also considered as tire components. As shown in FIG. 1, the example tread 10 may have circumferential grooves 20, each groove 20 essentially defining a U-shaped opening in the tread 10. The main portion of the tread 10 may be formed of one or more tread compounds. Moreover, the grooves 20, in particular the bottoms and/or sidewalls of the grooves 20 could be reinforced by a rubber compound having a higher hardness and/or stiffness than the remaining tread compound. Such a reinforcement may be referred to herein as a groove reinforcement.

While the embodiment of FIG. 1 suggests a plurality of tire components including for instance apexes 5, chippers 7, flippers 8 and overlay 12, such and further components are not mandatory for the invention. Also, the turned-up end of the carcass ply 9 is not necessary for the invention or may pass on the opposite side of the bead area 3 and end on the axially inner side of the bead 4 instead of the axially outer side of the bead 4. The tire could also have for instance a different number of grooves 20, e.g. less than four grooves.

One or more of the above tire components are made of a rubber composition in accordance with an embodiment of the present invention which comprises in a non-limiting example a blend of a solution polymerized styrene-butadiene rubber and a polybutadiene rubber, 80 phr of silica as a filler, and from 1.5 phr to 8 phr of an epoxidized and aminated triglyceride. In the present example, the epoxidized and aminated triglyceride has been prepared on the basis of soybean oil.

As shown in below Table 1, Inventive Examples 1, 2, 3, 4, and 5, which are in accordance with embodiments of the present invention, comprise styrene butadiene rubber, polybutadiene, silica, TDAE oil and different amounts of epoxidized and aminated soybean oil. The Control Sample does not comprise any epoxidized and aminated vegetable oil but comprises only 26 phr TDAE oil instead.

TABLE 1

| Materials | phr | | | | | |
|---|---|---|---|---|---|---|
| | Control Sample | Inventive Example 1 | Inventive Example 2 | Inventive Example 3 | Inventive Example 4 | Inventive Example 5 |
| SBR[1] | 80 | 80 | 80 | 80 | 80 | 80 |
| Polybutadiene[2] | 20 | 20 | 20 | 20 | 20 | 20 |
| Silica[3] | 80 | 80 | 80 | 80 | 80 | 80 |
| Epoxidized and aminated vegetable oil[4] | 0 | 1.5 | 3 | 4.5 | 6 | 8 |
| TDAE Oil | 26 | 24.5 | 23 | 21.5 | 20 | 18 |
| Zinc Oxide | 2.5 | 2.5 | 2.5 | 2.5 | 2.5 | 2.5 |
| Stearic Acid | 3 | 3 | 3 | 3 | 3 | 3 |
| Silane[5] | 8 | 8 | 8 | 8 | 8 | 8 |
| Antidegradant | 2.5 | 2.5 | 2.5 | 2.5 | 2.5 | 2.5 |
| Sulfur | 1.1 | 1.1 | 1.1 | 1.1 | 1.1 | 1.1 |
| MBT[6] | 0.3 | 0.3 | 0.3 | 0.3 | 0.3 | 0.3 |
| DPG[7] | 3.2 | 3.2 | 3.2 | 3.2 | 3.2 | 3.2 |
| CBS[8] | 2.3 | 2.3 | 2.3 | 2.3 | 2.3 | 2.3 |

[1]as Sprintan ™ SLR 4602 from the company Trinseo

[2]as Budene 1229 from Goodyear Chemical

[3]as Zeosil ™ Premium 200MP

[4]as an epoxidized and aminated soybean oil, with fatty acid residues having on average about 1.2 double bonds aminated, with the rest of double bonds remaining epoxidized. The amination was carried out with diethylamine

[5]as Si266 ™ from the company Evonik

[6]benzothiazyl disulfide

[7]diphenylguanidine

[8]N-cyclohexyl-benzothiazole-2-sulfenamide

Table 2 shows test data obtained with the Control Sample and the Inventive Examples listed above in Table 1. Mixing energy is reduced in the silica compound up to the order of 10% with increasing epoxidized and aminated vegetable oil content. However, a plateau may be reached at about 6 phr epoxidized and aminated vegetable load. Moreover, tensile strength and modulus improve significantly by more than 10% upon partial replacement of TDAE oil by the epoxidized an aminated vegetable oil.

TABLE 2

| Property | Control Sample | Inventive Example 1 | Inventive Example 2 | Inventive Example 3 | Inventive Example 4 | Inventive Example 5 |
| --- | --- | --- | --- | --- | --- | --- |
| Mixing energy [kJ] | 155 | 152 | 148 | 144 | 141 | 141 |
| Tensile strength [MPa] | 13 | 15 | 15 | 15 | 15 | 15 |
| Storage Modulus at 200% [MPa] | 6.5 | 8.2 | 8.2 | 8.2 | 8.2 | 8.2 |

While certain representative embodiments and details have been shown for the purpose of illustrating the subject invention, it will be apparent to those skilled in this art that various changes and modifications can be made therein without departing from the scope of the subject invention.

What is claimed is:

1. A rubber composition comprising:
   100 phr of at least one diene-based elastomer,
   30 phr to 250 phr of at least one filler, and
   1 phr to 40 phr of an epoxidized and aminated fatty acid ester, wherein the epoxidized and aminated fatty acid ester is obtained from the reaction of an epoxidized fatty acid ester with an aliphatic amine.

2. The rubber composition of claim 1 wherein the aliphatic amine is a dialkyl amine having alkyl groups that contain from 1 to 8 carbon atoms.

3. The rubber composition of claim 2 wherein the aliphatic amine is a secondary non-cyclic amine.

4. The rubber composition of claim 1 wherein the fatty acid ester is a mono glyceride.

5. The rubber composition of claim 1 wherein the fatty acid ester is a diglyceride.

6. The rubber composition of claim 1 wherein the fatty acid ester is a triglyceride.

7. The rubber composition of claim 6 wherein the triglyceride is a vegetable oil which is selected from the group consisting of sunflower oil, soybean oil, palm oil, canola oil, rapeseed oil, corn oil, coconut oil, cottonseed oil, olive oil, peanut oil, and safflower oil.

8. The rubber composition of claim 1 wherein the fatty acid ester comprises at least one fatty acid chain, wherein at least all but one of the double bonds of each fatty acid chain are epoxidized.

9. The rubber composition of claim 1 wherein the degree of amination of the epoxidized double bonds is within a range of 5% to 90%.

10. The rubber composition of claim 1 wherein said at least one filler comprises from 50 phr to 250 phr of silica, and wherein said silica has a surface area within a range of 80 m²/g to 250 m²/g as determined in accordance with ASTM D5604-96, and wherein said silica has 5 to 15 silanol groups per square nanometer surface area.

11. The rubber composition of claim 1 wherein the epoxidized and aminated fatty acid ester is present at a level which is within the range of 1.5 phr to 15 phr.

12. The rubber composition of claim 1 wherein the rubber composition comprises a liquid plasticizer, wherein the ratio between the liquid plasticizer and the epoxidized and aminated fatty acid ester ranges from 20:1 to 3:1.

13. The rubber composition of claim 1, wherein said diene based rubber is further comprised of 60 phr to 100 phr of styrene butadiene rubber, and 0 phr to 40 phr of polybutadiene rubber.

14. The rubber composition of claim 1 wherein said styrene butadiene rubber has a glass transition temperature within a range of −85° C. to −5° C. and wherein the polybutadiene has a glass transition temperature which is within a range of −85° C. to −110° C.

15. The rubber composition of claim 1 wherein the epoxidized and aminated fatty acid ester comprises at least one fatty acid residue comprising from 1 to 4 epoxy groups, from 1 to 4 hydroxyl groups and from 1 to 4 amine groups.

16. The rubber composition of claim 1 wherein the aliphatic amine is selected from the group consisting of dimethylamine, diethylamine, di-n-propylamine, di-iso-propylamine, di-n-butylamine, di-iso-butylamine, di-t-butylamine, dipentylamines, dihexylamines, diheptylamines, and dioctylamines, bis(cyclohexylmethyl)amine, N-methylbenzylamine, N-ethylbenzylamine, N-isopropylbenzylamine, dibenzylamine, N-methylethanolamine, N-ethylethanolamine, N-propylethanolamine, N-isopropylethanolamine, N-butylethanolamine, diethanolamine, diisopropanolamine, and bis(2-methoxyethyl)amine.

17. A rubber product comprising the rubber composition of claim 1 the rubber product is selected from a tire, a power transmission belt, a hose, a track, an air sleeve, and a conveyor belt.

18. A tire comprising one or more rubber components selected from a tread, a shear-band, rubber spokes, an under-tread, a sidewall, an apex, a flipper, a chipper, a chafer, a carcass, a belt, an overlay, and wherein one or more of the rubber components are comprised of the rubber composition of claim 1.

19. A rubber composition comprising:
   100 phr of at least one diene-based elastomer,
   30 phr to 250 phr of at least one filler, and
   1 phr to 40 phr of an epoxidized and aminated fatty acid ester, wherein the epoxidized and aminated fatty acid ester is obtained from the reaction of an epoxidized fatty acid ester with a secondary amine having the following structure:

wherein $R^1$, $R^2$, $R^3$, $R^4$, $R^5$, and $R^6$ are independently selected from hydrogens, linear or branched alkyl groups, cycloalkyl groups, aryl groups, hydroxyalkyl groups or alkoxyalkyl groups.

20. The rubber composition of claim 19 wherein the molecular weight of the secondary amine does not exceed 555 g/mol.

\* \* \* \* \*